United States Patent Office  3,539,556
Patented Nov. 10, 1970

3,539,556
STEROIDO-PYRAZOLE ANTI-INFLAMMATORY COMPOSITIONS

Frederik W. Stonner, Chatham, N.Y., assignor to Sterling Drug Inc., New York, N.Y., a corporation of Delaware
No Drawing. Filed Aug. 9, 1967, Ser. No. 659,292
Int. Cl. C07c 173/10
U.S. Cl. 260—239.5          17 Claims

ABSTRACT OF THE DISCLOSURE

17β - hydroxy - 17 - ethynyl - 4 - androsteno[3,2 - c]-2' - phenyl- and 2' - (p - fluorophenyl)pyrazole and certain substituted analogs thereof are the active ingredients of new glucocorticoid-anti-inflammatory compositions. The steroids are prepared either by reacting the appropriate 2-hydroxymethylene-3-oxo-steroid with phenylhydrazine or p-fluorophenylhydrazine, or by 17-alkynylation of appropriate 17-oxo-steroido[3,2-c]pyrazole.

---

This invention relates to certain anti-inflammatory steroid compositions, to methods for administering them, to certain novel steroid compounds which are the active ingredients of said compositions, and to intermediates in the preparation thereof.

All previously known glucocorticoid type antiinflammatory agents of a practical degree of activity, such as cortisone and its synthetic analogs have certain structural features in common. These structural features include carbonyl (oxo) groups in the 3- and 20-positions, an oxygen function (hydroxy or oxo) in the 11-position, a 17α-hydroxy group, a hydroxy or acyloxy group in the 21-position, and a double bond in the 4,5-position. It has been the experience of those skilled in the art that elimination of any one of these structural features results in a marked decrease in activity.

It has now surprisingly been found that a certain group of compounds in which none of these structural features need be present except the 4,5-double bond has potent glucocorticoid anti-inflammatory activity. This group of compounds comprises compounds of the formula

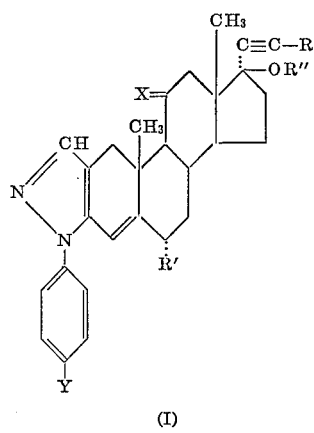

(I)

wherein R is hydrogen, lower-alkyl, hydroxy-lower alkyl, lower-alkanoyloxy-lower-alkyl, chloro, formyl or di-(lower-alkyl) aminomethyl; R' is hydrogen or methyl; R" is hydrogen or lower-alkanoyl; X is $H_2$, (β-OH)(H) or O; and Y is hydrogen or fluoro; or a compound of the above formula having a double bond in the 6,7-position.

The term "lower-alkyl" used hereinabove in defining certain R groups stands for alkyl having from one to about four carbon atoms and thus includes such groups as methyl, ethyl, propyl, isopropyl, butyl, isobutyl, and the like.

The term "lower-alkanoyl" used hereinabove in defining certain R and R" groups stands for alkanoyl having from one to about six carbon atoms and thus stands for such groups as formyl, acetyl, propionyl, butyryl, isobutyryl, valeryl, caproyl, and the like.

Endocrinological and anti-inflammatory evaluation of the compounds of Formula I by standard test procedures involving oral or parenteral administration to rats, has shown that they have glucocorticoid activity of a long duration of action in terms of glycogen deposition and thymolytic action; and anti-inflammatory activity as measured by inhibition of the cotton pellet granuloma formation and inhibition of carrageenin edema. Unlike most steroids, they are more active orally than by parenteral adminstration. The compounds of Formula I are also active topically against localized inflammatory conditions. These properties indicate the usefulness of the compounds in chronic therapy of rheumatoid arthritis, asthma, dermatitis, emphysema, and the like. The actual determination of the numerical biological data definitive for a particular compound is readily determined by standard test procedures by technicians having ordinary skill in pharmacological test procedures, without the need for any extensive experimentation.

The compounds of Formula I are effective in amounts of 1–50 mg. per dosage unit depending upon the compound used, the manner of administration and the condition to be treated. They are prepared for use by conventional pharmaceutical procedures used to formulate other steroid hormones; that is, in capsule or tablet form with conventional excipients (for example, calcium carbonate, starch, lactose, talc, magnesium stearate, gum acacia, and the like) for oral administration; as an aqueous or oil suspension in a pharmaceutically acceptable vehicle (aqueous alcohol, glycol, oil solution, or oil-water emulsion) for parenteral administration; or in an ointment or cream base for topical application.

The invention in one composition aspect thus relates to a pharmaceutical composition comprising a non-toxic pharmaceutical carrier and an effective amount of an anti-inflammatory compound of Formula I; and the invention in its process aspect relates to a method for treating inflammatory conditions in mammals which comprises administering to said mammals a pharmaceutical composition comprising a non-toxic pharmaceutical carrier and an effective amount of an anti-inflammatory compound of Formula I.

Particularly preferred specific embodiments of the invention are the compound, 17β-hydroxy-17-ethynyl-4-androsteno-[3,2-c]-2'-(p-fluorophenyl)pyrazole, and anti-inflammatory compositions containing this compound as the effective ingredient.

The compounds of Formula I are prepared by one of two alternative approaches as follows:

(A) By introduction of a hydroxymethylene group in the 2-position of ethisterone or a substituted ethisterone, followed by reaction with phenylhydrazine or p-fluorophenylhydrazine:

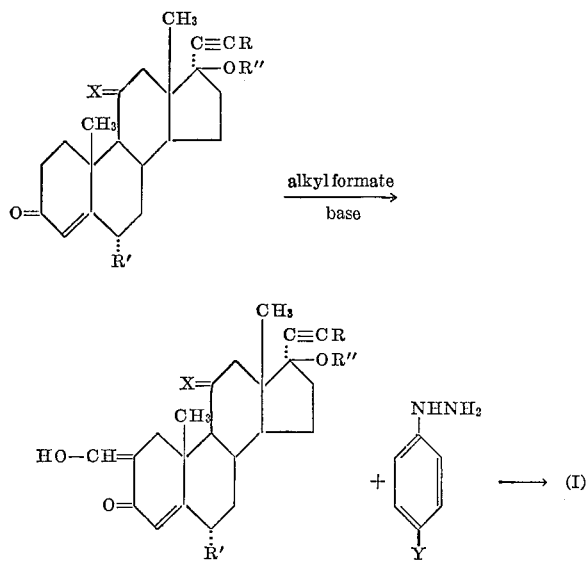

(B) Formation of a 17β-hydroxy-4-androsteno[3,2-c]-2'-phenylpyrazole, oxidation to the corresponding 17-oxo compound, followed by alkynylation at C-17:

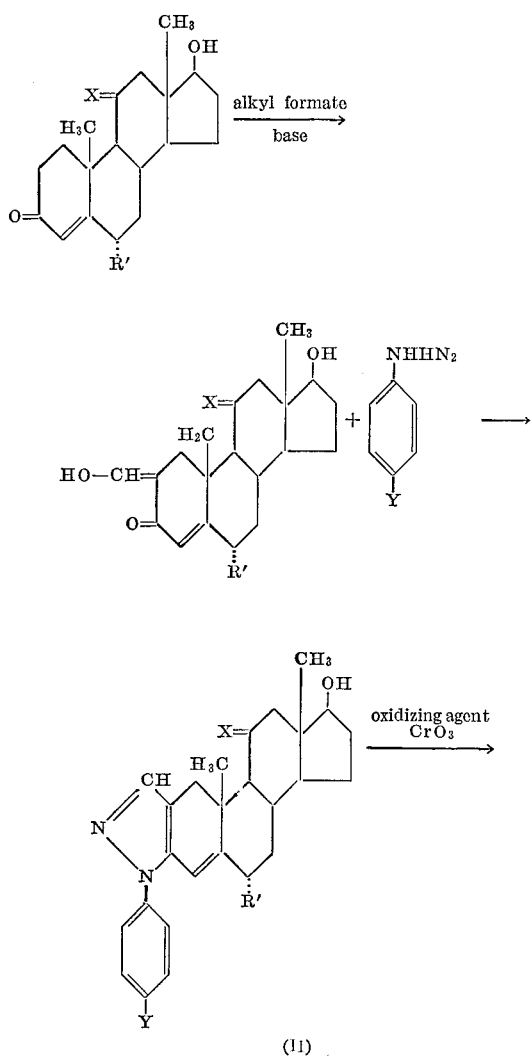

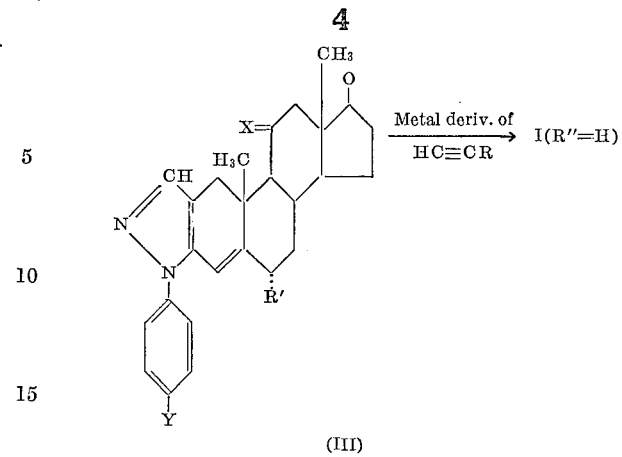

In the foregoing flow-sheets, the symbols R, R', R", X and Y have the meanings given hereinabove and there can, if desired, be a double bond in the 6,7-position.

In the oxidation of compounds of Formula II wherein X is (β-OH)(H) to form compounds of Formula III, the 11-hydroxy group is oxidized to an 11-oxo group (X is O).

Procedure A is preferred when the ethynyl group is unsubstituted (R is hydrogen). Procedure B is preferred when the ethynyl group in the resulting compound of Formula I is substituted (R is other than hydrogen).

The compounds of Formula I wherein R is formyl, in view of the highly reactive nature of the aldehydo group, are preferably prepared by oxidation of the corresponding compounds wherein R is hydroxymethyl. Any oxidizing agent known to oxidize primary alcohols to aldehydes can be used. Manganese dioxide is a preferred oxidizing agent.

The Compounds of Formula I wherein R is lower-alkyl can alternatively be prepared by alkylation of the corresponding compounds where R is hydrogen, the 17-hydroxy group being protected in the form of a tetrahydropyranyl ether. The alkylation is carried out by means of a lower-alkyl halide in the presence of a strong base, for example lithium amide in liquid ammonia.

The compounds of Formula I wherein R is lower-alkanoyloxy-lower-alkyl or R" is lower-alkanoyl are preferably prepared by direct esterification of the compounds of Formula I wherein R is hydroxy-lower-alkyl or R" is hydrogen, respectively. This can be carried out by treating the hydroxy compound with an excess of a lower-alkonic acid anhydride or chloride in pyridine solution. The primary alcohol (R is hydroxy-lower-alkyl) is esterified under mild conditions (room temperature), whereas the tertiary alcohol (R" is H) requires more stringent conditions (heating at about 100° C.).

The invention in another composition aspect relates to chemical compounds of Formula I wherein R is hydrogen, lower-alkyl, hydroxy-lower-alkyl, lower-alkanoyloxy-lower-alkyl, formyl or di-(loweralkyl)-aminomethyl; R' is hydrogen or methyl; R" is hydrogen or lower-alkanoyl; X is $H_2$, (β-OH)(H) or O, and Y is hydrogen or fluoro; at least one of R, R' and X being other than hydrogen; or a compound of Formula I having a double bond in the 6,7-position and wherein R is hydrogen, lower-alkyl, hydroxy-lower-alkyl, lower-alkanoyloxy-lower-alkyl, formyl or di-(loweralkyl)aminomethyl; R' is hydrogen or methyl; R" is hydrogen or lower-alkanoyl; X is $H_2$, (β-OH)(H) or O; and Y is hydrogen or fluoro.

The invention in still another composition aspect relates to chemical compounds of Formula II, wherein R' is hydrogen or methyl, X is $H_2$, (β-OH)(H) or O, and Y is hydrogen or fluoro; and compounds of Formula III, wherein R' is hydrogen or methyl, X is $H_2$ or O, and Y is hydrogen or fluoro. The compounds of Formulas II and III are useful as intermediates in preparing the compounds of Formula I.

The compounds of Formula I, except in the case where R is di-lower-alkylaminomethyl, are not sufficiently basic to form stable acid-addition salts. However, the compounds where R is di-lower-alkylaminomethyl possess a distinctly basic nitrogen atom and these compounds form acid-addition salts upon treatment with strong inorganic or organic acids. Such acid-addition salts are also within the purview of the invention and are the full equivalents of the free bases claimed herein. Pharmaceutically acceptable acid-addition salts, such as the hydrochloride, hydrobromide, phosphate, sulfate, lactate, tartrate, citrate and the like salts, are preferred, although all salts, whether pharmaceutically acceptable or not, are useful as characterizing derivatives and as intermediates in the formation or purification of the free bases and other salts.

The structures of the componds of Formula I and the intermediates of Formulas II and III were established by the modes of preparation, by elementary analyses, by infrared and ultraviolet spectra, and by their behavior in thin layer chromatography.

The following examples will further illustrate the invention without the latter being limited thereby.

EXAMPLE 1

(a) 2 - hydroxymethylene-17α-ethynyl-4-androsten-17β-ol-3-one.—To a suspension of 120 g. of 17α-ethynyl-4-androsten-17β-ol-3-one in 1 liter of pyridine under a nitrogen atmosphere was added 43 g. of powdered sodium methoxide. The mixture was stirred and 192 ml. of ethyl formate was added portionwise over a one hour period. The mixture was stirred for three hours longer and then poured into ten liters of water. The mixture was filtered and the solid material washed with water, the aqueous filtrate and washings were made acidic by addition of concentrated hydrochloric acid. The solid product was collected, washed with water, and dried at 50° C. for six hours, to give 112 g. of 2-hydroxymethylene-17α-ethynyl-4-androsten-17β-ol-3-one, M.P. 175–183° C.

(b) 17β - hydroxy - 17-ethynyl-4-androsteno[3,2-c]-2'-phenylpyrazole [I; R, R' and R'' are H, X is $H_2$, Y is H].—A mixture of 5.00 g. of 2-hydroxymethylene-17α-ethynyl-4-androsten-17β-ol-3-one. 1.73 g. of phenylhydrazine and 25 ml. of ethanol was refluxed for 90 minutes. The solvent was removed in vacuo, the residue dissolved in benzene and the solution poured onto a column of 150 g. of activated magnesium silicate prewet with benzene. The column was eluted with benzene (19 250 ml. portions) and benzene containing 25% ether (17 250 ml. portions). The combined eluted material (4.17 g.) was recrystallized successively from actone, ethyl acetate and aqueous acetone to give 17β-hydroxy-17-ethynyl-4-androsteno[3,2 - c] - 2'-phenylpyrazole, M.P. 231–232° C. (sealed evacuated tube), $[\alpha]_D^{25} = +50.1°$ (1% in chloroform).

17β - hydroxy - 17-ethynyl-4-androsteno[3,2-c]-2'-phenylpyrazole, when administered at a dose of 10 mg./kg./day for 12 days subcutaneously to intact mature female rats caused adrenal atrophy, thymic involution, pituitary atrophy, hyperglycemia, and decreased concentrations of corticosterone in the plasma and adrenals. These effects were comparable in nature and magnitude to those caused by standard cortical steroids, e.g., prednisone and 9α-fluorocortisol.

17β - hydroxy-17-ethynyl-4-androsteno[3,2-c]-2'-phenylpyrazole, when administered at dose levels of 10 and 30 mg./kg./day for five days orally to adrenalectomized male rats was found to be approximately equipotent to prednisone in terms of thymolysis and liver glycogen deposition.

EXAMPLE 2

17β - hydroxy - 17-ethynyl-4-androsteno[3,2-c]-2'-(p-fluorophenyl)-pyrazole [I; R, R' and R'' are H, X is $H_2$, Y is F].—To a solution of 2.46 g. of sodium acetate in 4 ml. of water was added 4.31 g. of p-fluorophenylhydrazine hydrochloride and 80 ml. of glacial acetic acid. The mixture was stirred for 15 minutes and 10 g. of 2-hydroxymethylene - 17α - ethynyl-4-androsten-17β-ol-3-one was added. The reaction mixture was heated on a steam bath for 90 minutes and then poured into 800 ml. of water with stirring. The mixture was allowed to stand for three days, and the product was collected by filtration, washed with water and air-dried. The resulting 12.1 g. of product was dissolved in ether, the solution decolorized with activated charcoal and pentane added to the boiling solution. Upon cooling, the product crystallized and it was recrystallized repeatedly from the same solvent mixture to give 5.9 g. of 17β-hydroxy-17-ethynyl-4-androsteno[3,2-c]-2'-(p-fluorophenyl)pyrazole, M.P. 204–206° C., after softening at 116° C.; $[\alpha]_D^{25} = +49.5°$ (1% in chloroform).

Adrenalectomized male rats were medicated orally with 17β - hydroxy-17-ethynyl-4-androsteno[3,2-c]-2'-(p-fluorophenyl)pyrazole for five days. The results showed that this compound was six times more active than prednisone in terms of glycogen deposition and involution of the thymus. The glycogenic response of a single medication of 17β - hydroxy-17-ethynyl-4-androsteno-[3,2-c]-2'-(p-fluorophenyl)pyrazole persisted for twenty-four hours in contrast to prednisone or 6α-methylprednisolone which have little or no glycogenic activity twenty-four hours following medication.

17β - hydroxy - 17-ethynyl-4-androsteno[3,2-c]-2'-(p-fluorophenyl)pyrazole is 2 times more glycogenic and 2.4 times more thymolytic orally than subcutaneously. This is in contrast to results obtained with prednisolone which is 0.17 times as glycogenic and 0.24 times as thymolytic orally as compared with subcutaneous administration. The longer duration of action and higher oral activity of 17β - hydroxy - 17 - ethynyl-4-androsteno-[3,2-c]-2'-(p-fluorophenyl)pyrazole as compared with standard cortical hormones means that less frequent medication is necessary wtih less likelihood of appearance of side-effects.

17β - hydroxy - 17-ethynyl-4-androsteno[3,2-c]-2'-(p-fluorophenyl)pyrazole produced kaluresis at a dose about one-third to equal its minimal thymolytic and glycogenic dose in contrast to prednisone and 6α-methylprednisolone which were kaluretic at one-tenth their minimal thymolytic and glycogenic doses.

17β - hydroxy - 17-ethynyl-4-androsteno[3,2-c]-2'-(p-fluorophenyl)pyrazole was assessed for anti-inflammatory activity against carrageenin edema, Winter et al., Soc. Exptl. Biol. Med. 111, 544 (1962), and cotton granuloma formation, Winter et al., J. Am. Pharm. Assoc., Sci. Ed. 46, 515 (1957), in rats. It was found that a dose of 9 mg./kg. caused a 30% carrageenin edema inhibitory response, and orally it is as effective as prednisone. In the cotton granuloma test, when the steroid was placed directly on the cotton pellet, 17β-hydroxy-17-ethynyl-4-androsteno[3,2 - c]-2'-(p-fluorophenyl)pyrazole was 82 times more effective than prednisone and 0.7 times as effective as dexamethasone in locally inhibiting granuloma tissue formation.

17β - hydroxy - 17-ethynyl-4-androsteno[3,2-c]-2'-(p-fluorophenyl)pyrazole was also active against *E. coli* endotoxic induced lung inflammation in mice and croton oil granuloma pouch formation in rats.

Oral doses of 17β-hydroxy-17-ethynyl-4-androsteno-[3,2-c]-2'-(p-fluorophenyl)pyrazole up to 1000 and 1250 mg./kg.in dogs and rabbits were well tolerated. No gross tissue changes were observed in the dogs receiving the 1000 mg./kg. dose. Rhesus monkeys were given daily oral doses of 17β-hydroxy-17-ethynyl-4-androsteno[3,2-c]-2'-(p-fluorophenyl)-pyrazole up to 43.2 mg./kg. for three months, and the compound was well tolerated without any tissue or organ changes noted except an expected decrease in the size of the adrenals.

Pharmaceutical formulations containing 17β-hydroxy-17 - ethynyl-4-androsteno[3,2-c]-2'-(p-fluorophenyl)pyrazole were prepared as follows:

Capsules for oral administration: 2 parts by weight of the steroid was milled to an average particle size of 5.2 microns and mixed with 119 parts of lactose and 119 parts of starch. Capsules were filled with the mixture, each capsule containing 240 mg. of the mixture (2 mg. of steroid). Similarly were prepared capsules containing 5.0 mg. of steroid (117.5 mg. of lactose and 117.5 mg. of starch) and 25.0 mg. of steroid (107.5 mg. of lactose and 107.5 mg. of starch).

Ointments for topical application: 2.5 g. of steroid was mixed with 100.0 g. of macrogol base. Similar ointments were prepared using 1.0 g. and 0.1 g. of steriod per 100.0 g. of macrogol base. Further ointments were prepared by mixing 0.1 g. or 0.025 g. of the steroid with 100 g. of white petrolatum.

EXAMPLE 3

$17\beta$ - acetoxy - 17-ethynyl-4-androsteno[3,2-c]-2'-phenylpyrazole[I; R and R' are H, R" is COCH$_3$, X is H$_2$, Y is H].—A mixture of 1.9 g. of 17$\beta$-hydroxy-17-ethynyl-4-androsteno[3,2-c]-2'-phenylpyrazole (Example 1b), 10 ml. of acetic anhydride and 10 ml. of pyridine was refluxed for about three hours. The reaction mixture was quenched in about 200 ml. of water, and the solid product was collected by filtration and washed with water. The solid product was dissolved in methylene dichloride, pentane added to the point of turbidity, and the solution treated with activated charcoal for decolorizing purposes and concentrated on a steam bath to remove the solvent. The residue was crystallized from ether and then recrystallized successively from ether-hexane, methylene dichloride-hexane and methanol.

$17\beta$ - acetoxy-17-ethynyl-4-androsteno[3,2-c]-2'-phenylpyrazole was found to have cortical hormone activity as indicated by an increase in liver glycogen and a decrease in thymus weight when administered orally to adrenalectomized male rats at a dose level of 40 mg./kg./day; and by a decrease in the weight of the thymus and adrenals when administered orally or subcutaneously to mature female rats at a dose level of 10 mg./kg./day.

By replacing the acetic anhydride in the foregoing example by a molar equivalent amount of propionic anhydride, butyric anhydride, caproyl chloride, or a mixture of formic acid and acetic anhydride, there can be obtained, respectively, 17$\beta$-propionoxy-17-ethynyl-4-androsteno[3,2-c]-2'-phenylpyrazole [I; R and R' are H, R" is COCH$_2$CH$_3$, X is H$_2$, Y is H], 17$\beta$-butyryloxy-17-ethynyl-4-androsteno[3,2-c]-2'-phenylpyrazole [I; R and R' are H, R" is Co(CH$_2$)$_2$CH$_3$, X is H$_2$, Y is H], 17$\beta$-caproyloxy - 17 - ethynyl-4-androsteno[3,2-c]-2'-phenylpyrazole [I; R and R' are H, R" is Co(CH$_2$)$_4$CH$_3$, X is H$_2$, Y is H], or 17$\beta$-formyloxy-17-ethynyl-4-androsteno [3,2-c]-2'-phenylpyrazole [I; R and R' are H, R" is COH, X is H$_2$, Y is H].

EXAMPLE 4

(a) 2 - hydroxymethylene - 17$\alpha$-ethynyl-6$\alpha$-methyl-4-androsten-17$\beta$-ol-3-one was prepared from 10.5 g. of 17$\alpha$-ethynyl-6$\alpha$-methyl-4-androsten-17$\beta$-ol-3-one, 17 ml. of ethyl formate and 3.8 g. of sodium methoxide according to the procedure described above in Example 1, part (a). The product had the M.P. 170–200° C. and was used directly in the following reaction without further purification.

(b) 17$\beta$ - hydroxy-17-ethynyl-6$\alpha$-methyl-4-androsteno [3,2-c]-2'-(p-fluorophenyl)pyrazole [I; R is H, R' is CH$_3$, R" is H, X is H$_2$, Y is F] was prepared from 9.0 g. of 2 - hydroxymethylene-17$\alpha$-ethynyl-6$\alpha$-methyl-4-androsten-17$\beta$-ol-3-one and 4.95 g. of p-fluorophenylhydrazine hydrochloride according to the procedure described above in Example 2. The crude product was dissolved in methylene dichloride and chromatographed on a column of 400 g. of silica gel. The column was eluted with methylene dichloride and with methylene dichloride containing 1–2% of acetone. The product was recrystallized from methylene dichloride-hexane and from carbon tetrachloride to give 17$\beta$ - hydroxy - 17-ethynyl-6$\alpha$-methyl-4-androsteno [3,2-c]-2'-(p-fluorophenyl)pyrazole, M.P. 129–130° C., containing solvent of crystallization; [$\alpha$]$_D^{28}$=+31.2° (1% in chloroform). Upon drying the compound became amorphous.

$17\beta$ - hydroxy-17-ethynyl-6$\alpha$-methyl-4-androsteno-[3,2-c]-2'-(p-fluorophenyl)pyrazole was found to have cortical hormone activity when administered orally to adrenalectomized male rats. It was 19 times as thymolytic and more than ten times as glycogenic as prednisone. It was more effective than prednisone as an anti-inflammatory agent in inhibiting carrageenin edema.

EXAMPLE 5

(a) 2 - hydroxymethylene - 17$\alpha$ - ethynyl-4-androstan-17$\beta$-ol-3,11-dione was prepared from 8.22 g. of 17$\alpha$-ethynyl-4-androstan-17$\beta$-ol-3,11-dione, 20.0 ml. of ethyl formate and 2.0 g. of sodium methoxide according to the procedure described above in Example 1, part (a). The product was recrystallized from acetone and obtained as yellow crystals, M.P. 174–176° C.; [$\alpha$]$_D^{25}$=+19.3 (1% in chloroform). Similarly, 2 - hydroxy - methylene - 17$\alpha$-ethynyl-4-androstene-11$\beta$,17$\beta$ - diol - 3 - one can be prepared from 17$\alpha$-ethynyl-4-androstene-11$\beta$,17$\beta$-diol-3-one.

(b) 17$\beta$-hydroxy - 17 - ethynyl - 11-oxo-4-androsteno [3,2-c]-2'-phenylpyrazole [I; R, R' and R" are H, X is O, Y is H].—A mixture of 5.32 g. of 2-hydroxymethylene-17$\beta$-ethynyl-4-androsten - 17$\beta$ - ol - 3,11-dione, 1.62 g. of phenylhydrazine and 100 ml. of acetic acid was heated on a steam bath for 30 min. Water was added to the point of turbidity, heated for ten minutes longer, then cooled and poured into water. The product was collected by filtration, crystallized from ethanol and from ethyl acetate to give 17$\beta$ - hydroxy - 17 - ethynyl-11-oxo-4-androsteno[3,2-c]-2'-phenylpyrazole, M.P. 219–221° C.; [$\alpha$]$_D^{25}$=+114.5° (1% in chloroform).

$17\beta$ - hydroxy-17-ethynyl-11-oxo-4-androsteno[3,2-c]-2'-phenylpyrazole was found to have cortical hormone activity when administered orally to adrenalectomized male rats. It was 3.1 times as thymolytic and 2 times as glycogenic as prednisone.

Similarly, 11$\beta$,17$\beta$-dihydroxy-17-ethynyl-4-androsteno-[3,2-c]-2'-phenylpyrazole [I; R, R' and R" are H, X is ($\beta$-OH)(H), Y is H] can be prepared from 2-hydroxymethylene-17$\alpha$-ethynyl-4-androstene-11$\beta$,17$\beta$-diol - 3 - one and phenylhydrazine.

EXAMPLE 6

17$\beta$-hydroxy - 17 - ethynyl-11-oxo-4-androsteno[3,2-c]-2'-(p-fluorophenyl)pyrazole [I; R, R' and R" are H, X is O, Y is F] was prepared from 16 g. of 2-hydroxymethylene-17$\alpha$-ethynyl-4-androsten-17$\beta$-ol-3,11-dione and 7.1 g. of p-fluorophenylhydrazine hydrochloride according to the procedure described above in Example 2. The crude product was dissolved in benzene and chromatographed on a column of 600 g. of acid washed alumina. The column was eluted with benzene, benzene containing increasing amounts of ether; and benzene containing increasing amounts of ethyl acetate. The product eluted with benzene containing 20% ether and benzene containing 20% ethyl acetate was combined, dissolved in pentane-benzene, and rechromatographed on 250 g. of silica gel. The column was eluted with pentane containing increasing amounts of ether and with ether. The latter brought out the desired product which was recrystallized from ether to give 17$\beta$-hydroxy - 17 - ethynyl-11-oxo-4-androsteno[3,2-c]-2'-(p - fluorophenyl)pyrazole, yellow amorphous solid, [$\alpha$]$_D^{25}$=+88.1° (1% in chloroform).

$17\beta$-hydroxy-17-ethynyl-11-oxo-4-androstene[3,2-c]-2'-(p-fluorophenyl)pyrazole was found to have cortical hormone activity when administered orally to adrenalectomized male rats. It was approximately 3 to 6 times more active than prednisone in terms of thymolysis and liver glycogen deposition.

Similarly, 11β,17β - dihydroxy-17-ethynyl-4-androsteno [3,2-c]-2'-(p-fluorophenyl)pyrazole [I; R, R' and R'' are H, X is (β-OH)(H), Y is F] can be prepared from 2-hydroxymethylene - 17α - ethynyl-4-androstene-11β,17β-diol-3-one and p-fluorophenylhydrazine.

EXAMPLE 7

(a) 2 - hydroxymethylene - 17α - ethynyl - 4,6 - androstadien-17β-ol-3-one was prepared from 9.2 g. of 17α-ethynyl - 4,6 - androstadien-17β-ol-3-one, 15 ml. of ethyl formate and 3.4 g. of sodium methoxide according to the procedure described above in Example 1, part (a). The product was used directly in the following procedure.

(b) 17β - hydroxy-17-ethynyl-4,6-androstadieno[3,2-c]-2'-(p-fluorophenyl)pyrazole [I; R, R' and R'' are H, X is $H_2$, Y is F, $\Delta^6$] was prepared from the total product obtained in part (a) above and 5.37 g. of p-fluorophenylhydrazine hydrochloride according to the procedure described above in Example 2. The product was chromatographed on alumina and eluted with benzene, benzene-ether and ether. The product was then further purified by dissolving it in methylene dichloride and causing it to separate from solution by adding isopropyl alcohol and concentrating the solution. There was thus obtained 6.5 g. of 17β-hydroxy - 17 - ethynyl-4,6-androstadieno[3,2-c]-2'-(p-fluorophenyl)pyrazole as a pale orange, amorphous solid, $[\alpha]_D^{25}=-280.7°$ (1% in chloroform).

17β - hydroxy - 17 - ethynyl-4,6-androstadieno[3,2-c]-2'-(p-fluorophenyl)pyrazole was found to have cortical hormone activity when administered orally to adrenalectomized male rats. It was about 2.6 times as thymolytic and about 3.4 times as glycogenic as prednisone.

By a procedure analogous to that of Example 1, 2-hydroxymethylene - 17α - ethynyl-4,6-androstadien-17β-ol-3-one can be caused to react with phenylhydrazine to give 17β - hydroxy - 17 - ethynyl-4,6-androstadieno[3,2-c]-2'-phenylpyrazole [I; R, R' and R'' are H, X is $H_2$, Y is H, $\Delta^6$].

By a procedure analogous to that of Example 7, 2-hydroxymethylene-17α-ethynyl-4,6-androstadien - 17β-ol-3,11-dione (prepared from 17α-ethynyl-4,6-androstadien-17β-ol-3,11-dione and ethyl formate in the presence of sodium methoxide) can be caused to react with p-fluorophenylhydrazine hydrochloride to give 17β-hydroxy-17-ethynyl - 11 - oxo-4,6-androstadieno-[3,2-c]-2'-(p-fluorophenyl)pyrazole [I; R, R' and R'' are H, X is O, Y is F, $\Delta^6$]; and 2 - hydroxymethylene-17α-ethynyl-4,6-androstadiene-11β,17β-diol-3-one (prepared from 17α-ethynyl-4,6-androstadiene-11β,17β-diol-3-one and ethyl formate in the presence of sodium methoxide) can be caused to react with p-fluorophenylhydrazine to give 11β,17β-dihydroxy-17-ethynyl-4,6-androstadieno[3,2-c]-2'-(p - fluorophenyl)pyrazole [I; R, R' and R'' are H, X is (β-OH)(H), Y is F, $\Delta^6$].

EXAMPLE 8

(a) 2-hydroxymethylene - 17α - ethynyl-6-methyl-4,6-androstadien-17β-ol-3-one was prepared from 12.1 g. of 17α-ethynyl-6-methyl - 4,6 - androstadien-17β-ol-3-one, 20 ml. of ethyl formate and 4.5 g. of sodium methoxide according to the procedure described above in Example 1, part (a). The product was recrystallized from acetone and had the M.P. 234-237° C.

(b) 17β-hydroxy-17-ethynyl-6-methyl - 4,6 - androstadieno[3,2-c] - 2' - (p-fluorophenyl)pyrazole [I; R is H, R' is $CH_3$, R'' is H, X is $H_2$, Y is F, $\Delta^6$] was prepared from 8.33 g. of 2-hydroxymethylene - 17α - ethynyl-6-methyl-4,6 - androstadien-17β-ol-3-one and 4.07 g. of p-fluorophenylhydrazine hydrochloride according to the procedure described above in Example 2. The product was recrystallized repeatedly from aqueous dimethylformamide to give 6.3 g. of 17β-hydroxy-17-ethynyl-6-androstadieno [3,2-c]-2'-(p - fluorophenyl)pyrazole, M.P. 241-242° C. $[\alpha]_D^{25}=-225.9°$ (1% in chloroform).

EXAMPLE 9

(a) 17β - hydroxy - 4 - androsteno[3,2-c]-2'-(p-fluorophenyl)pyrazole [II; R' is H, X is $H_2$, Y is F] was prepared from 50.6 g. of 2-hydroxymethylene-4-androsten-17β-ol-3-one and 27.0 g. of p-fluorophenylhydrazine hydrochloride according to the procedure described above in Example 2. There was obtained 38 g. of 17β-hydroxy-4-androstene[3,2-c] - 2' - (p - fluorophenyl)pyrazole, M.P. 190-194° C. after recrystallization from a methylene dichlorideacetone mixture.

By replacing the p-fluorophenylhydrazine hydrochloride in the foregoing preparation with a molar equivalent amount of phenylhydrazine hydrochloride there can be obtained 17β-hydroxy - 4 - androsteno[3,2-c]-2'-phenylpyrazole [II; R' is H, X is $H_2$, Y is H].

By replacing the 2-hydroxymethylene-4-androsten-17β-ol-3-one in the foregoing preparation by a molar equivalent amount of 2-hydroxymethylene-6α - methyl-4-androstene - 17β-ol-3-one, 2-hydroxymethylene-4-androsten-17β-ol-3,11-dione, 2-hydroxymethylene-4-androstene-11β,17β-diol-3-one, or 2-hydroxymethylene-4,6-androstadiene-17β-ol-3-one, there can be obtained, respectively, 17β-hydroxy-6α-methyl-4-androsteno-[3,2-c] - 2' - (p - fluorophenyl)pyrazole [II; R' is $CH_3$, X is $H_2$, Y is F], 17β-hydroxy-11-oxo-4-androsteno[3,2-c] - 2' - (p - fluorophenyl)pyrazole [II; R' is H, X is O, Y is F], 11β,17β-dihydroxy-4-androsteno[3,2-c] - 2' - (p - fluorophenyl)pyrazole [II; R' is H, X is (β-OH) (H), Y is F], or 17β-hydroxy-4,6-androstadieno[3,2-c] - 2' - (p - fluorophenyl)pyrazole [II; R' is H, X is $H_2$, Y is F, $\Delta^6$].

(b) 17-oxo - 4 - androsteno[3,2-c]-2'-(p-fluorophenyl)pyrazole [III; R' is H, X is $H_2$, Y is F].—A solution of 3.50 g. of chromic oxide and 3 ml. of concentrated sulfuric acid in 10 ml. of water was cooled to 0° C. and added dropwise over a period of four minutes to a stirred suspension of 20.35 g. of 17β-hydroxy-4-androsteno[3,2-c]-2'-(p-fluorophenyl)pyrazole in 300 ml. of acetone cooled to —9° C. on an ice salt bath. The mixture was filtered, the solid washed with acetone, and the combined acetone solutions quenched in 2500 ml. of water. After 30 minutes the solid product was collected by filtration, washed with water and air-dried. The latter product was dissolved in methylene dichloride. The acetone-methylene dichloride matographed on a 400 g. column of silica gel prewet with the same solvent. The column was eluted successively with 30% pentane in methylene dichloride, 100% methylene dichloride, 0.5% acetone in methylene dichloride, 1.0% acetone in methylene dichloride and 1.5% acetone in methylene dichloride. The acetonemethylene dichloride fractions brought out the desired product which was recrystallized from ethyl acetate and from methanol-methylene dichloride to give 17-oxo-4-androsteno[3,2-c]-2'-(p-fluorophenyl)pyrazole, M.P. 243–246° C.;

$$[\alpha]_D^{25}=+177.5°$$

(1% in chloroform).

Similarly, 17β-hydroxy - 4 - androsteno[3,2-c]-2'-phenylpyrazole, 17β-hydroxy - 6α - methyl-4-androsteno[3,2-c]-2'-(p-fluorophenyl)pyrazole, 17β - hydroxy-11-oxo-4-androsteno[3,2 - c] - 2' - (p-fluorophenyl)pyrazole, or 17β - hydroxy - 4,6 - androstadieno[3,2-c]-2'-(p-fluorophenyl)pyrazole can be oxidized, respectively, to give 17-oxo-4-androsteno[3,2-c] - 2' - phenylpyrazole [III; R' is H, X is $H_2$, Y is H], 17-oxo-6α-methyl-4-androsteno[3,2-c]-2'-(p-fluorophenyl)pyrazole [III; R' is $CH_3$, X is $H_2$, Y is F]; 11,17 - dioxo-4-androsteno[3,2-c]-2'-(p-fluorophenyl)pyrazole [III; R' is H, X is O, Y is F], or 17-oxo-4,6 - androstadieno[3,2-c] - 2' - (p-fluorophenyl)pyrazole [III; R' is H, X is $H_2$, Y is F, $\Delta^6$].

(c) 17β-hydroxy-17 chloroethynyl - 4 - androsteno [3,2-c] - 2' - (p-fluorophenyl)pyrazole [I; R is Cl, R' and R'' are H, X is $H_2$, Y is F].—To a stirred solution of 75 ml. of methyllithium in ether (1.7 M) at 0° C. (ice bath) under nitrogen was added slowly 15 ml. of cis-dichloroethylene in 25 ml. of ether. The ice-bath was removed and the mixture stirred for 30 min. The mixture was cooled in ice again, and a solution of 6.76 g. of 17-oxo-4-androsteno[3,2-c] - 2' - (p-fluorophenyl)pyrazole in 100 ml. of tetrahydrofuran was added over a period of 20 min. The reaction mixture was stirred at 0° for 30 min., and then 50 ml. of water was added cautiously. The layers were separated, and the organic layer was washed with water and saturated sodium chloride solution, dried over anhydrous sodium sulfate and concentrated to remove the solvent. The residue was recrystallized from a methylene dichloride-methanol mixture to give 5.75 g. of 17β-hydroxy-17-chloroethynyl-4-androsteno[3,2-c] - 2' - (p-fluorophenyl) pyrazole, M.P. 144–148° C.; $[\alpha]_D^{25} = +29.6°$ (1% in chloroform).

17β-hydroxy - 17 - ethynyl-4-androstadieno[3,2-c]-2'-(p-fluorophenyl)pyrazole was found to have cortical hormone activity when administered orally to adrenalectomized male rats. It was 9 times as thymolytic and 4 times as glycogenic as prednisone.

By a procedure analogous to that of Example 9 (c), 17-oxo-4,6-androstadieno[3,2-c] - 2' - (p-fluorophenyl)pyrazole can be caused to react with cis-dichloroethylene and methyllithium to give 17β-hydroxy-17-chloroethynyl-4,6-androstadieno[3,2-c]-2'-(p-fluorophenyl)pyrazole [I; R is Cl, R' and R" are H, X is $H_2$, Y is F, $\Delta^6$].

EXAMPLE 10

17β-hydroxy - 17-(3-hydroxy-1-propynyl) - 4 - androsteno[3,2 - c] - 2' - (p - fluorophenyl)pyrazole [I; R is $CH_2OH$, R' and R" are H, X is $H_2$, Y is F].—To 250 ml. of liquid ammonia were added slowly with stirring in succession 7.80 g. of potassium metal, 11.2 g. of propargyl alcohol, 180 ml. of pyridine and 20.2 g. of 17-oxo-4-androsteno[3,2-c]-2'-(p-fluorophenyl)pyrazole. The last traces of steroid were washed in with 70 ml. of pyridine. Stirring was continued and a warm water bath applied while passing nitrogen gas through and allowing the ammonia to escape. After four and one-half hours, the mixture had reached room temperature and was added to 4 liters of water. The solid product was collected by filtration, washed with water and recrystallized from acetone to give 17β-hydroxy-17-(3-hydroxy-1-propynyl)-4-androsteno[3,2,c]-2'-(p-fluorophenyl)pyrazole, pale beige crystals, M.P. 232–237° C.; $[\alpha]_D^{25} = +38.7°$ (1% in chloroform).

17β - hydroxy - 17 - (3-hydroxy-1-propynyl)-4-androsteno[3,2-c]-2'-(p-fluorophenyl)pyrazole was found to have cortical hormone activity when administered orally to adrenalectomized male rats. It brought about liver glycogen deposition at a dose level of 30 m./kg./day. When administered orally to mature female rats at a dose level of 10 mg./kg./day, it produced highly significant decreases in the mean weight of the adrenals and thymus.

17β - hydroxy - 17 - (3-hydroxy-1-propynyl)-4-androsteno-[3,2-c]-2'-(p-fluorophenyl)pyrazole when treated with acetic anhydride in pyridine at room temperature is converted to 17β-hydroxy-17-(3-acetoxy-1-propynyl)-4-androsteno[3,2-c]-2'-(p-fluorophenyl)pyrazole [I; R is $CH_2OCOCH_3$, R' and R')' are H, X is $H_2$, Y is F]; and if the esterification mixture is heated to 100° C. for several hours there is produced 17β-acetoxy-17-(3-acetoxy-1-propynyl)-4-androsteno[3,2-c]-2'(p-fluorophenyl)- pyrazole [I; R is $CH_2OCOCH_3$, R' is H, R" is $COCH_3$, X is $H_2$, Y is F].

By procedure analogous to that described above in Example 10, the potassium derivative of propynyl alcohol can be caused to react with 17-oxo-4-androsteno[3,2-c]-2' - phenyl-pyrazole, 17-oxo-6α-methyl-4-androsteno[3,2-c]-2' - (p-fluorophenyl)pyrazole, 11,17 - dioxo-4-androsteno[3,2-c]-2'-(p-fluorophenyl)pyrazole, or 17-oxo-4,6-androstadieno[3,2-c]-2'-(p-fluorophenyl)pyrazole to give respectively, 17β - hydroxy-17-(3-hydroxy-1-propynyl)-4-androsteno[3,2-c]-2'-phenylpyrazole [I; R is $CH_2OH$, R' and R" are H, X is $H_2$, Y is H]; 17β-hydroxy-17-(3-hydroxy-1-propynyl)-6α-methyl-4-androsteno[3,2-c] - 2'-(p-fluorophenyl)pyrazole [I; R is $CH_2OH$, R' is $CH_3$, R" is H, X is $H_2$, Y is F]; 17β-hydroxy-17-(3-hydroxy-1-propynyl) - 11-oxo-4-androsteno[3,2-c]-2'-(p-fluorophenyl)pyrazole [I; R is $CH_2OH$, R' and R" are H, X is O, Y is F]; or 17β-hydroxy-17-(3-hydroxy-1-propynyl)-4,6-androstadieno[3,2-c]-2'-(p-fluorophenyl)pyrazole [I; R is $CH_2OH$, R' and R" are H, X is $H_2$, Y is F, $\Delta^6$]. 17β-hydroxy-17-(3-hydroxy-1-propynyl)- 4,6 - androstadieno-[3,2-c]-2'-(p-fluorophenyl)pyrazole can be esterified with acetic anhydride in pyridine to give 17β-hydroxy-17-(3-acetoxy-1-propynyl) - 4,6 - androstadieno[3,2-c]-2' - (p-fluorophenyl)pyrazole [I; R is $CH_2OCOCH_3$, R' and R" are H, X is $H_2$, Y is F, $\Delta^6$] (room temperature product), or 17β - acetoxy-17-(3-acetoxy-1-propynyl)-4,6-androstadieno[3,2 - c] - 2' - (p-fluorophenyl)pyrazole [I; R is $CH_2OCOCH_3$, R' is H, R" is $COCH_3$ X is $H_2$, Y is F, $\Delta^6$] (100° C. product).

EXAMPLE 11

17β - hydroxy - 17 - (3-oxo-1-propynyl)-4-androsteno-[3,2-c] - 2' - (p-fluorophenyl)pyrazole [I; R is CHO, R' and R" are H, X is $H_2$, Y is F].—A mixture of 7.2 g. of 17β - hydroxy-17-(3-hydroxy-1-propynyl) - 4-androsteno[3,2-c]-2'-(p-fluorophenyl)pyrazole, 36 g. of manganese dioxide and 100 ml. of tetrahydrofuran was stirred at room temperature for two hours. Methylene dichloride (200 ml.) was then added, the mixture filtered, and the filtrate concentrated in vacuo. The residue was crystallized from ether and recrystallized from acetonitrile to give 4.15 g. of 17β-hydroxy-17-(3-oxo-1-propynyl) - 4 - androsteno[3,2-c]-2'-(p-fluorophenyl)pyrazole, pale tan crystals, M.P. 207–209° C.; $[\alpha]_D^{25} = +17.1°$ (1% in chloroform).

17β - hydroxy-17-(3-oxo-1-propynyl)-4 - androsteno-[3,2-c]-2' - (p-fluorophenyl)pyrazole administered subcutaneously at a dose of 30 mg./kg. to adrenalectomized rats resulted in the retention of urine, sodium and chlorides, but potassium excretion was not altered; and when administered substaneously at a dose of 5 mg./kg. to mature female rats, it produced a significant reduction of the mean weight of the adrenals and thymus.

By a procedure analogous to that of Example 11, 17β-hydroxy - 17 - (3-hydroxy-1-propynyl)-4,6-androstadieno[3,2-c] - 2' - (p-fluorophenylpyrazole can be oxidized with manganese dioxide to produce 17β-hydroxy-17-(3-oxo-1-propynyl)-4,6-androstadieno[3,2-c]-2' - (p - fluorophenyl)pyrazole [I; R is CHO, R' and R" are H, X is $H_2$, Y is F, $\Delta^6$].

EXAMPLE 12

17β - hydroxy - 17 - (3-dimethylamino-1-propynyl)-4-androsteno[3,2-c]-2'-(p-fluorophenyl)pyrazole [I; R is $CH_2N(CH_3)_2$, R' and R" are H, X is $H_2$, Y is F].—A mixture of 1.13 g. of lithium amide, 4.20 g. of 3-dimethylamino-1-propyne and 50 ml. of dioxane was refluxed for one hour with stirring. There was then added a solution of 10.1 g. of 17-oxo-4-androsteno[3,2-c]-2'-(p-fluorophenyl)pyrazole in 50 ml. of hot dioxane, and the mixture was heated and stirred at 90° C. for 28 hours. The reaction mixture was quenched in water containing enough hydrochloric acid such that the resulting mixture was approximately neutral. The solid product was collected by filtration, washed with water, and crystallized from methylene dichloride containing hydrogen chloride. The resulting salt was recrystallized from a methylene dichloride-acetone mixture to give 17β-hydroxy-17-(3-dimethylamino-1-propynyl) - 4 - androsteno[3,2-c]-2'-(p-fluorophenyl)pyrazole in the form of its hydrochloride salt M.P. 268–269° C.

17β - hydroxy - 17 - (3-dimethylamino-1-propynyl)-4-androsteno[3,2-c]-2'-(p-fluorophenyl)pyrazole was found to have cortical hormone activity when administered orally to adrenalectomized male rats. It was 0.5 times as thymolytic and 0.4 times as glycogenic as prednisone. When administered orally to mature female rats at a dose level of 10 mg./kg., it produced highly significant decreases in the mean weight of the adrenals and thymus.

By replacing the 3-dimethylamino-1-propyne in the foregoing preparation by a molar equivalent amount of 3-dibutylamino - 1 - propyne there can be obtained 17β-hydroxy - 17-(3-dibutylamino-1-propynyl)-4-androsteno-[3,2-c]-2'-(p-fluorophenyl)pyrazole [I; R is $$CH_2N(C_4H_9)_2$$

R' and R" are H, X is $H_2$, Y is F].

By a procedure analogous to that of Example 12, 17-oxo-4,6-androstadieno[3,2-c]-2'-(p-fluorophenyl)pyrazole can be caused to react with 3-dimethylamino-1-propyne and lithium amide to give 17β-hydroxy-17-(3-dimethylamino - 1 - propynyl) - 4,6-androstadieno[3,2-c]-2'-(p-fluorophenyl)pyrazole [I; R is $CH_2H(CH_3)_2$, R' and R" are H, X is $H_2$, Y is F,$\Delta^6$].

EXAMPLE 13

(a) 17β - hydroxy - 17 - ethynyl - 4 - androsteno[3,2-c]-2' - phenylpyrazole-17-tetrahydropyranyl ether.—A solution of 7.35 g. of 17β - hydroxy-17-ethynyl-4-androsteno [3,2 - c] - 2' - phenylpyrazole (Example 1(b)) in 75 ml. of methylene dichloride was boiled for a few minutes, then cooled to room temperature, and 7 ml. of dihydropyran and a few drops of phosphorus oxychloride were added. The reaction mixture was stirred, and after 100 min. 3 drops more of phosphorus oxychloride was added. The reaction mixture was stirred for a total of 7.5 hours and allowed to stand overnight. Excess powdered sodium carbonate was added and the mixture stirred for 30 min. Water was added and the layers separated. The organic layer was washed with water, dried over anhydrous sodium sulfate, and a drop of pyridine was added. The solution was concentrated to dryness and the residue crystallized from a methylene dichloride-methanol mixture to give 4.0 g. of the tetrahydropyranyl ether, M.P. 223–229° C.

(b) 17β - hydroxy - 17 - (1 - propynyl) - 4 - androsteno [3,2 - c] - 2' - phenylpyrazole [I; R is $CH_3$, R' and R" are H, X is $H_2$, Y is H].—To 100 ml. of liquid ammonia was added with stirring 0.46 g. of lithium and 200 mg. of ferric chloride. After 26 min. there was added a solution of 4.44 g. of 17β - hydroxy - 17 - ethynyl - 4 - androsteno[3,2 - c] - 2' - phenylpyrazole 17 - tetrahydropyranyl ether in 170 ml. of ether and 90 ml. of dioxane over a 30-min. period. The mixture was stirred for 30 min. and then 12 ml. of methyl iodide in 25 ml. of ether was added. The reaction mixture was stirred for 150 min. Ammonium chloride (4.1 g.) was added, the ammonia allowed to evaporate, and the remaining mixture poured into 200 ml. of water, mixed, and the layers separated. The organic layer was washed with water, dilute hydrochloric acid, dilute sodium carbonate solution and saturated sodium chloride solution, dried over anhydrous sodium sulfate and concentrated in vacuo. The residue was dissolved in 25 ml. of acetic acid and heated on a hot plate to boiling. Water (20 ml.) was added and the solution boiled for 10 min. and then quenched in 250 ml. of water. The solid product was collected by filtration, washed with water and recrystallized first from methanol and then from acetone and dried for 7 hours in vacuo at 85° C. to give 17β - hydroxy - 17 - (1-propynyl) - 4 - androsteno[3,2 - c] - 2' - phenylpyrazole in the form of a hemihydrate, M.P. 189–195° C.;

$$[\alpha]_D^{25} = +35.4°$$

(1% in chloroform).

By replacing the methyl iodide in the foregoing preparation by a molar equivalent amount of n-butyl iodide, there can be obtained 17β - hydroxy - 17 - (1 - hexynyl) - 4-androsteno-[3,2-c]-2'-phenylpyrazole[I; R is $$(CH_2)_3CH_3$$

R' and R" are H, X is $H_2$, Y is F].

17β - Hydroxy - 17 - (1 - propynyl) - 4 - androsteno [3,2 - c] - 2' - phenylpyrazole can also be prepared by reacting 17 - oxo - 4 - androsteno[3,2 - c] - 2' - phenylpyrazole with propynyllithium in liquid ammonia.

17β - hydroxy - 17 - (1 - propynyl) - 4 - androsteno [3,2 - c] - 2' - phenylpyrazole was found to have cortical hormone activity when administered orally to adrenalectomized male rats at a dose level of 5 mg./kg./day, as measured by glycogenic and thymolytic activity. When administered orally to mature female rats at a dose level of 2 mg./kg./day it produced significant decreases in the mean weight of the adrenals and thymus.

EXAMPLE 14

(a) 17β - hydroxy - 17 - ethynyl - 4 - androsteno[3,2-c] - 2' - (p - fluorophenyl)pyrazole 17 - tetrahydropyranyl ether was prepared from 20 g. of 17β-hydroxy-17-ethynyl-4 - androsteno[3,2 - c] - 2' - (p - fluorophenyl)pyrazole and 20 ml. of dihydropyran according to the procedure described above in Example 13(a). There was obtained 14.35 g. of prdouct used directly in the following reaction.

(b) 17β - hydroxy - 17 - (1 - propynyl) - 4 - androsteno [3,2 - c] - 2' - (p - fluorophenyl)pyrazole [I; R is $CH_3$, R' and R" are H, X is $H_2$, Y is F] was prepared by methylation of 15.2 g. of 17β - hydroxy - 17 - ethynyl - 4 - androsteno[3,2 - c] - 2' - (p - fluorophenyl)pyrazole 17 - tetrahydropyranyl ether according to the procedure described above in Example 13(b). The product was purified by treatment with Girard's P reagent in methanol and acetic acid, and then chromatographed in benzene solution on a column of 400 g. of silica gel. The column was eluted with benzene and the product recrystallized from acetonitrile to give 17β - hydroxy - 17 - (1 - propynyl) - 4 - androsteno[3,2-c] - 2' - (p - fluorophenyl)pyrazole, M.P. 197–204° C.; $[\alpha]_D^{25} = +34.3°$ (1% in chloroform).

17β - hydroxy - 17 - (1 - propynyl) - 4 - androsteno [3,2 - c] - 2' - (p - fluorophenyl)pyrazole was found to have cortical hormone activity when administered subcutaneously to mature female rats, at a dose level of 10 mg./kg./day, as measured by decreased mean weight of the adrenals and thymus.

By a procedure analogous to that of Example 13, 17β-hydroxy - 17 - ethynyl - 4,6 - androstadieno[3,2 - c] - 2'-(p - fluorophenyl)pyrazole (Example 7) can be converted to its 17 - tetrahydropyranyl ether, and the latter caused to react with methyl iodide in the presence of lithium amide to give 17β - hydroxy - 17 - (1 - propynyl) - 4,6-androstadieno[3,2 - c] - 2' - (p - fluorophenyl)pyrazole [I; R is $CH_3$, R' and R" are H, X is $H_2$, Y is F, $\Delta^6$].

I claim:

1. A method for treating inflammatory conditions in mammals which comprises administering to said mammals a pharmaceutical composition comprising a nontoxic pharmaceutical carrier and an effective amount of an anti-inflammatory comppound of the formula:

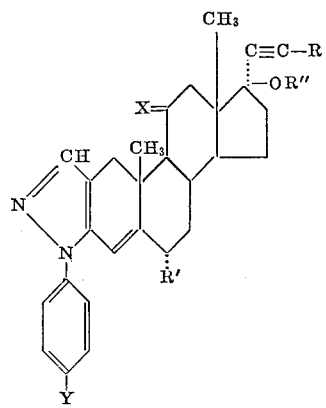

wherein R is hydrogen, lower-alkyl, hydroxy-lower-alkyl, lower-alkanoyloxy-lower-alkyl, chloro, formyl or di- (lower-alkyl)-aminomethyl; R' is hydrogen or methyl; R" is hydrogen or lower-alkanoyl; X is $H_2$, ($\beta$-OH)(H) or O; and Y is hydrogen or fluoro; or a compound of the above formula having a double bond in the 6,7-position.

2. A method according to claim 1 wherein the antiinflammatory compound is 17$\beta$-hydroxy-17-ethynyl-4-androsteno[3,2-c]-2'-(p-fluorophenyl)-pyrazole.

3. A compound of the formula

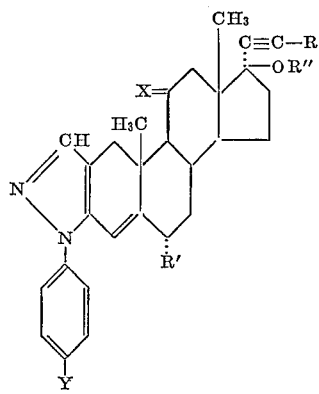

wherein R is hydroxy-lower-alkyl, lower-alkanoyloxy-lower-alkyl, formyl or di-(lower-alkyl)aminomethyl; R' is hydrogen or methyl; R" is hydrogen or lower-alkanoyl; X is $H_2$, ($\beta$-OH)(H) or O; and Y is hydrogen or fluoro; or a compound of the above formula having a double bond in the 6,7-position and wherein R is hydrogen, lower-alkyl, hydroxy-lower-alkyl, lower-alkanoyl-lower-alkyl, formyl or di-(lower-alkyl)aminomethyl; R' is hydrogen or methyl; R" is hydrogen or lower-alkanoyl; X is $H_2$, ($\beta$-OH)(H) or O; and Y is hydrogen or fluoro.

4. 17$\beta$ - hydroxy - 17 - (1 - propynyl) - 4 - androsteno[3,2-c]-2'-phenylpyrazole.

5. 17$\beta$ - hydroxy - 17 - ethynyl - 11 - oxo - 4 - androsteno[3,2-c]-2'-phenylpyrazole.

6. 17$\beta$ - hydroxy - 17 - ethynyl - 11 - oxo - 4 - androsteno[3,2-c]-2'-(p-fluorophenyl)pyrazole.

7. 17$\beta$ - hydroxy - 17 - ethynyl - 6$\alpha$ - methyl - 4 - androsteno[3,2-c]-2'-(p-fluorophenyl)pyrazole.

8. 17$\beta$ - hydroxy - 17 - (3 - hydroxy - 1 - propynyl)-4-androsteno[3,2-c]-2'-(p-fluorophenyl)pyrazole, according to claim 5 wherein R is hydroxymethyl, R' and R" are hydrogen, X is $H_2$, and Y is fluoro.

9. 17$\beta$ - hydroxy - 17 - (3 - oxo - 1 - propynyl) - 4-androsteno[3,2-c]-2'-(p-fluorophenyl)pyrazole, according to claim 5 wherein R is formyl, R' and R" are hydrogen, X is $H_2$, and Y is fluoro.

10. 17$\beta$ - hydroxy - 17 - ethynyl - 4,6 - androstadieno[3,2-c]-2'-(p-fluorophenyl)pyrazole, according to claim 5 wherein R, R' and R" are H, X is $H_2$, Y is fluoro, and there is a double bond in the 6,7-position.

11. 17$\beta$ - hydroxy - 17 - (3 - dimethylamino - 1 - propynyl) - 4 - androsteno[3,2-c] - 2' - (p - fluorophenyl)pyrazole, according to clam 5 wherein R is dimethylaminomethyl, R' and R" are hydrogen, X is $H_2$, and Y is fluoro.

12. 17$\beta$ - hydroxy - 17 - (1 - propynyl) - 4 - androsteno[3,2-c]-2'-(p-fluorophenyl)pyrazole.

13. 17$\beta$ - hydroxy - 17 - ethynyl - 6 - methyl - 4,6-androstadieno[3,2-c] - 2' - (p - fluorophenyl)pyrazole, according to claim 5 wherein R is hydrogen, R' is methyl, R" is hydrogen, X is $H_2$, Y is fluoro, and there is a double bond in the 6,7-position.

14. A compound of the formula

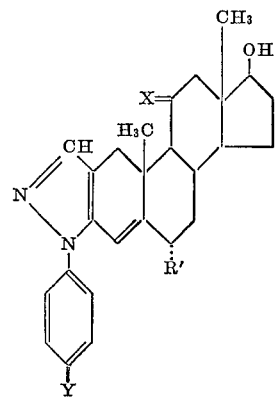

wherein R' is hydrogen or methyl, X is $H_2$, ($\beta$-OH)(H) or O, and Y is hydrogen or fluoro; or a compound of the above formula having a double bond in the 6,7-position, R', X and Y having the same meanings given hereinabove.

15. 17$\beta$ - hydroxy - 4 - androsteno[3,2-c]-2' - (p-fluorophenyl)pyrazole, according to claim 14 wherein R' is hydrogen, X is $H_2$, and Y is fluoro.

16. A compound of the formula

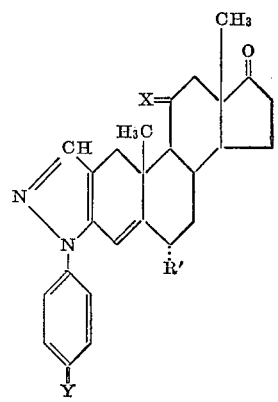

wherein R' is hydrogen or methyl, X is $H_2$ or O, and Y is hydrogen or fluoro; or a compound of the above formula having a double bond in the 6,7-position, R', X and Y having the same meanings given hereinabove.

17. 17 - oxo - 4 - androsteno[3,2-c] - 2' - (p - fluorophenyl)pyrazole, according to claim 16 wherein R' is hydrogen, X is $H_2$, and Y is fluoro.

References Cited

UNITED STATES PATENTS 3,290,293    12/1966    Hirschmann _____ 260—239.5

ELBERT L. ROBERTS, Primary Examiner

U.S. Cl. X.R.

260—397.45, 397.4

UNITED STATES PATENT OFFICE
CERTIFICATE OF CORRECTION

Patent No. 3,539,556                    Dated November 10, 1970

Inventor(s) Frederik W. Stonner

It is certified that error appears in the above-identified patent and that said Letters Patent are hereby corrected as shown below:

Column 3, line 46, in the right-hand formula, "NHHN$_2$" should read --NHNH$_2$--; line 50, in the left-hand formula, "H$_2$C" should read --H$_3$C--.

Column 4, formula III, 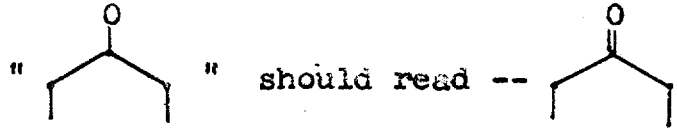 line 49, "lower-alkonic" should read --lower-alkanoic--.

Column 7, line 47 and line 50, "Co" should read --CO-- (both occurrences).

Column 8, line 6, "ethnyl" should read --ethynyl--; line 15 and line 17, "androstan" should read --androsten-- (both occurrences).

Column 10, line 44, line should read --methylene dichloride containing 30% pentane and chro- --.

Column 11, line 14, "+29.6°" should read -- +26.9°--; line "m./" should read --mg./--; line 61, "and R')'" should read --and R"--.

Column 15, line 47, Claim 8; line 51, Claim 9; line 54, Claim 10; line 59, Claim 11, "according to claim 5" should read --according to claim 3-- (each occurrence).

Column 16, line 1, Claim 13, "according to claim 5" should read --according to claim 3--.

Signed and sealed this 23rd day of May 1972.

(SEAL)
Attest:

EDWARD M. FLETCHER, JR.
Attesting Officer

ROBERT GOTTSCHALK
Commissioner of Patents